US012762504B2

(12) United States Patent
Kim et al.

(10) Patent No.: US 12,762,504 B2
(45) Date of Patent: Oct. 13, 2026

(54) METHOD AND SYSTEM FOR PREVENTING CARGO LOSS IN TRAILERS THROUGH SERVICE SHARING BETWEEN VEHICLE AND TRAILER

(71) Applicants: Hyundai Motor Company, Seoul (KR); Kia Corporation, Seoul (KR)

(72) Inventors: Myeong Gwan Kim, Hwaseong-Si (KR); Ui Jung Jung, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/188,506

(22) Filed: Apr. 24, 2025

(65) Prior Publication Data

US 2026/0105407 A1 Apr. 16, 2026

(30) Foreign Application Priority Data

Oct. 16, 2024 (KR) ........................ 10-2024-0141124

(51) Int. Cl.
*G06Q 10/0833* (2023.01)
*B60W 60/00* (2020.01)

(52) U.S. Cl.
CPC ..... *G06Q 10/0833* (2013.01); *B60W 60/0053* (2020.02); *B60W 2556/45* (2020.02)

(58) Field of Classification Search
CPC .......... G06Q 10/0833; B60W 60/0053; B60W 2556/45
See application file for complete search history.

(56) References Cited

U.S. PATENT DOCUMENTS

2013/0147617 A1* 6/2013 Boling ............... G06Q 10/0833 340/431
2020/0334631 A1* 10/2020 Conlon .................. G08B 25/10
2020/0412574 A1* 12/2020 Haslam .................... H04W 4/40
2025/0282324 A1* 9/2025 Raikar .................... B60R 25/34

* cited by examiner

*Primary Examiner* — Aaron L Troost
(74) *Attorney, Agent, or Firm* — Banner & Witcoff, Ltd.

(57) ABSTRACT

A method for preventing cargo loss in a trailer of a vehicle is introduced. The method may comprise communicatively coupling to the trailer and obtaining trailer information of the trailer via the coupling. The vehicle may transmit vehicle information and the trailer information to a server. Based on the transmitting, the vehicle may receive, from the server, a pair of selected software components for cargo monitoring, wherein the pair of selected software components comprise vehicle software and trailer software. The vehicle may transmit the trailer software to the trailer and perform loss prevention monitoring for a cargo in the trailer by operating the vehicle software, while the vehicle software interworks with the transmitted trailer software.

17 Claims, 11 Drawing Sheets

METHOD AND SYSTEM FOR PREVENTING CARGO LOSS IN TRAILERS THROUGH SERVICE SHARING BETWEEN VEHICLE AND TRAILER

CROSS REFERENCE TO RELATED APPLICATION

The present application claims the benefit of priority to a Korean provisional application 10-2024-0141124, filed in the Korean Intellectual Property Office on Oct. 16, 2024, the entire contents of which are incorporated herein for all purposes by reference.

TECHNICAL FIELD

The present disclosure relates to a service sharing method and device between a vehicle and a trailer for preventing cargo loss, and more particularly, to a method and device for sharing a service by connecting a vehicle and a trailer for communication and receiving software based on information on the vehicle and the trailer.

BACKGROUND

The matters described in this Background section are only for enhancement of understanding of the background of the disclosure, and should not be taken as acknowledgment that they correspond to prior art already known to those skilled in the art.

The commercial trailer industry is growing by mechanically combining commercial vehicles with various functions according to purposes. There are many domestic trailer companies, and each carrier may request an original equipment manufacturer (OEM) to manufacture a vehicle coupled with a trailer equipped with a specific function. Particularly, with the growth of the courier industry, there has been growth in the demand for trailers and vehicles for performing delivered cargo-related functions.

In the modern society, packages are an indispensable means of business in various markets. Accordingly, the package market has continuously grown. However, along with the increase of the market size, various issues including failure of delivery or loss of packages are also on the rise.

Thus, a method is being considered for a vehicle and a trailer to receive cargo monitoring software from a server and to efficiently share a service for preventing cargo loss.

SUMMARY

The effects obtainable from the present disclosure are not limited to the above-mentioned effects, and other effects not mentioned herein will be clearly understood by those skilled in the art through the following descriptions.

According to the present disclosure, a method performed by a vehicle for preventing cargo loss in a trailer of the vehicle, the method may comprise communicatively coupling to the trailer, obtaining, via the coupling, trailer information of the trailer, transmitting, to a server, vehicle information of the vehicle and the trailer information, based on the transmitting, receiving, from the server, a pair of selected software components for cargo monitoring, wherein the pair of selected software components comprise vehicle software and trailer software, transmitting the trailer software to the trailer, and performing loss prevention monitoring for a cargo in the trailer by operating the vehicle software, while the vehicle software interworks with the transmitted trailer software.

The method, wherein the performing loss prevention monitoring may comprise at least one of cargo inquiry monitoring in the trailer or cargo loss event detection monitoring in the trailer.

The method may further comprise performing, based on operation of the transmitted trailer software, route optimization according to a cargo destination.

The method, wherein the cargo inquiry monitoring in the trailer may comprise receiving, from an external device, an inquiry request for the cargo in the trailer, transmitting the inquiry request to the trailer, receiving, from the trailer, a response to the inquiry request, and sending, to the external device, a cargo list of the trailer, wherein the cargo list of the trailer is a response to the inquiry request from the external device.

The method, wherein the cargo loss event detection monitoring in the trailer may comprise receiving, from the server, a cargo list managed by the server, forwarding the cargo list to the trailer, receiving, from the trailer, a response about an inquiry into the cargo in the trailer, receiving, from the trailer, an alert of a cargo difference in the trailer, and forwarding the alert of the cargo difference in the trailer to an external device.

According to the present disclosure, a method performed by a trailer of a vehicle for preventing cargo loss in the trailer, the method may comprise communicatively coupling to the vehicle, transmitting, via the coupling, trailer information of the trailer to the vehicle, receiving, from the vehicle, trailer software for cargo monitoring, wherein the trailer software corresponds to software selected by a server based on vehicle information of the vehicle and the trailer information, and wherein the vehicle information and the trailer information are transmitted by the vehicle to the server, and performing loss prevention monitoring for a cargo in the trailer by operating the received trailer software, while the received trailer software interworks with vehicle software, installed in the vehicle, for cargo monitoring.

The method, wherein the performing loss prevention monitoring may comprise at least one of cargo inquiry monitoring in the trailer or cargo loss event detection monitoring in the trailer.

The method, wherein the cargo inquiry monitoring in the trailer may comprise receiving, from the vehicle, an inquiry request for the cargo in the trailer, receiving, from a communication device associated with the cargo, a response about an inquiry into the cargo in the trailer, and sending a cargo list of the trailer to the vehicle, wherein the cargo list of the trailer is a response to the inquiry request from the vehicle.

The method, wherein the cargo loss event detection monitoring in the trailer may comprise receiving, from the vehicle, a cargo list managed by the server, receiving, from a communication device associated with the cargo, a response about an inquiry into the cargo in the trailer, wherein the response may comprise a cargo list of the trailer, detecting, based on the cargo list of the trailer, a cargo difference in the trailer, and forwarding an alert of the cargo difference in the trailer to the vehicle.

The method, wherein the cargo loss event detection monitoring may further comprise, based on at least one of a door open signal of the trailer, a door close signal of the trailer, a departure signal of the vehicle, or navigation destination information, updating data of the server by comparing data of the trailer and data of the vehicle.

According to the present disclosure, a method performed by a server for preventing cargo loss in a trailer of a vehicle, the method may comprise receiving, from the vehicle, trailer information obtained from the trailer and vehicle information, selecting, based on the vehicle information and the trailer information, a pair of software components for cargo monitoring, wherein the pair of software components comprise vehicle software and trailer software, adding trailer data to the vehicle software, transmitting the selected pair of software components to the vehicle, and causing the selected pair of software components to interwork with each other to perform monitoring for a cargo in the trailer and receive a monitoring result.

According to the present disclosure, a vehicle for preventing trailer cargo loss in a trailer of the vehicle, the vehicle may comprise a communication interface configured to communicate the trailer, a processor, and a memory storing an instruction that, when executed by the processor, is configured to cause the vehicle to perform wired and wireless communication with a server and a trailer controller of the trailer, communicatively couple to the trailer controller, obtain, via the coupling, trailer information of the trailer from the trailer controller, transmit, to the server, vehicle information of the vehicle and the trailer information, receive, from the server and based on the transmitted vehicle information and the transmitted trailer information, a pair of selected software components for cargo monitoring, wherein the pair of selected software components comprise vehicle software and trailer software, transmit the trailer software to the trailer, and perform loss prevention monitoring for a cargo in the trailer by operating the vehicle software, while the vehicle software interworks with the transmitted trailer software.

The vehicle, wherein the instruction, when executed by the processor, is configured to cause the vehicle to perform the loss prevention monitoring by performing at least one of cargo inquiry monitoring in the trailer or cargo loss event detection monitoring in the trailer.

The vehicle, wherein the instruction, when executed by the processor, is configured to cause the vehicle to perform, based on operation of the transmitted trailer software, route optimization according to a cargo destination.

The vehicle, wherein the instruction, when executed by the processor, is configured to cause the vehicle to perform the cargo inquiry monitoring in the trailer by receiving, from an external device, an inquiry request for the cargo in the trailer, transmitting the inquiry request to the trailer, receiving, from the trailer, a response to the inquiry request, and sending, to the external device, a cargo list of the trailer, wherein the cargo list of the trailer is a response to the inquiry request from the external device.

The vehicle, wherein the instruction, when executed by the processor, is configured to cause the vehicle to perform the cargo loss event detection monitoring in the trailer by receiving, from the server, a cargo list managed by the server, forwarding the cargo list to the trailer, receiving, from the trailer, a response about an inquiry into the cargo in the trailer, receiving, from the trailer, an alert of a cargo difference in the trailer, and forwarding the alert of the cargo difference in the trailer to an external device.

The vehicle, wherein the instruction, when executed by the processor, is configured to adjust, based on the cargo difference in the trailer, autonomous driving control of the vehicle.

The vehicle, wherein the instruction, when executed by the processor, is configured to adjust the autonomous driving control of the vehicle by switching an autonomous driving mode to a manual driving mode.

According to the present disclosure, a trailer of a vehicle for preventing trailer cargo loss, the trailer may comprise a processor, and a memory configured to store an instruction that, when executed by the processor, is configured to cause the trailer to perform wired and wireless communication with a server and a vehicle controller, communicatively couple to the vehicle controller, transmit, via the coupling, trailer information to the vehicle controller, receive, from the vehicle controller, trailer software for cargo monitoring, wherein the trailer software corresponds to software selected by a server based on vehicle information and the trailer information, and the vehicle information and the trailer information are transmitted by the vehicle controller to the server, and perform loss prevention monitoring for a cargo in the trailer by operating the trailer software, wherein the trailer software is configured to interwork with vehicle software for cargo monitoring.

According to the present disclosure, a server for preventing trailer cargo loss, the server may comprise a processor, and a memory configured to store an instruction that, when executed by the processor, is configured to cause the server to receive, from a vehicle, trailer information obtained from the trailer controller and vehicle information obtained from the vehicle controller, select, based on the vehicle information and the trailer information, a pair of software components for cargo monitoring, wherein the pair of software components comprise vehicle software and trailer software, add trailer data to the vehicle software, transmit the selected pair of software components to the vehicle, and cause the selected pair of software components to interwork with each other to perform monitoring for a cargo and receive a monitoring result.

DETAILED DESCRIPTION

Figure 1:
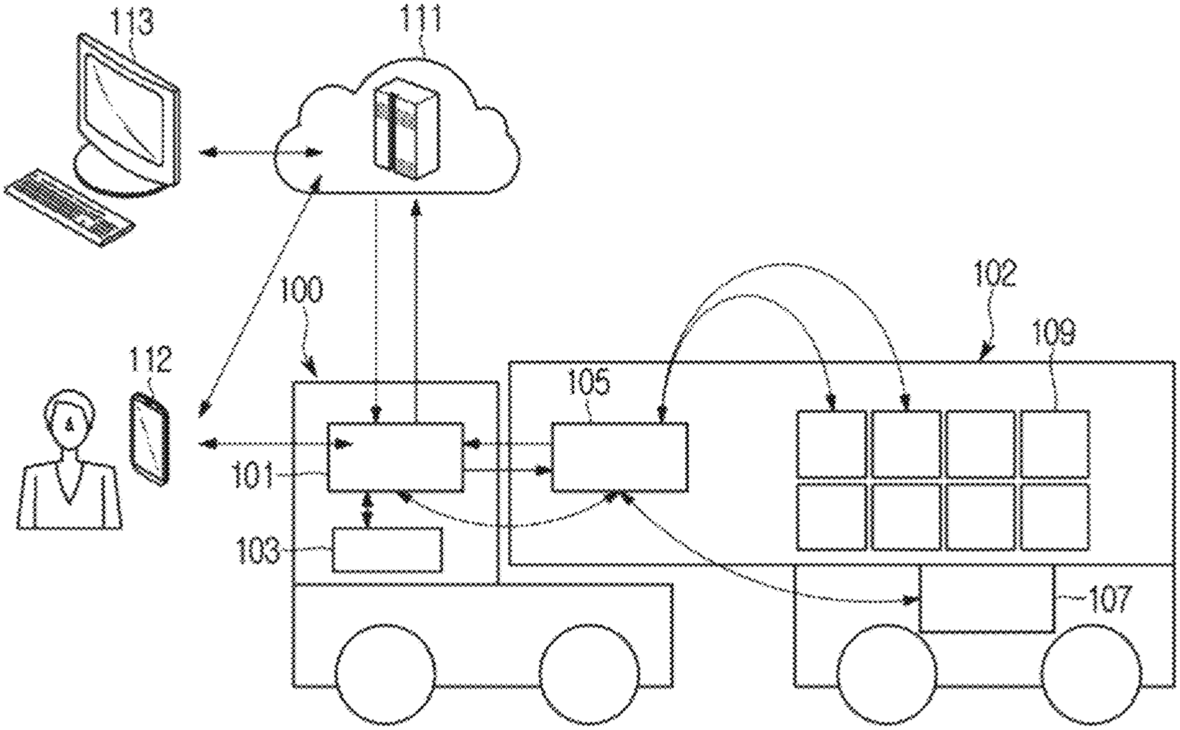
FIG. 1 shows an example of a vehicle, a trailer, a server, a management computer and an external device that perform wired and wireless communication and have a cargo monitoring service sharing device according to an example of the present disclosure.

Hereinafter, examples of the present disclosure are described in detail with reference to the accompanying drawings so that those having ordinary skill in the art may easily implement the present disclosure. However, examples of the present disclosure may be implemented in various different ways and thus the present disclosure is not limited to the examples described therein.

In describing examples of the present disclosure, well-known functions or constructions have not been described in detail since a detailed description thereof may have unnecessarily obscured the gist of the present disclosure. The same constituent elements in the drawings are denoted by the same reference numerals and a repeated or duplicative description of the same elements has been omitted.

In the present disclosure, when an element is simply referred to as being "connected to", "coupled to" or "linked to" another element, this may mean that an element is "directly connected to", "directly coupled to", or "directly linked to" another element or this may mean that an element is connected to, coupled to, or linked to another element with another element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an example may be termed a second element in another example, and, similarly, a second element in an example could be termed a first element in another example, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition, examples including other elements in addition to the elements described in the various examples are also included in the scope of the present disclosure.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

The advantages and features of the present disclosure and the ways of attaining them should become apparent to those of ordinary skill in the art with reference to examples of the present disclosure described below in detail in conjunction with the accompanying drawings. The examples of the present disclosure, however, may be embodied in many different forms and should not be constructed as being limited to the example examples set forth herein. Rather, the examples described herein are provided to make this disclosure more complete and to fully convey the scope of the present disclosure to those having ordinary skill in the art to which the present disclosure pertains.

The disclosure focuses on a system and method for preventing cargo loss in trailers during transportation by enabling service sharing between a vehicle and a trailer. It may integrate vehicle and trailer controllers through wired or wireless communication to monitor cargo status and detect discrepancies. Using dynamically selected vehicle and trailer software provided by a server, the system may facilitate real-time cargo inquiry and loss event detection via technologies like radio frequency identification (RFID) sensors. It may enable seamless data exchange among a server, vehicle, and trailer, with notifications sent to external devices such as a driver's smart device. Additional features may comprise delivery route optimization based on cargo destinations, enhancing operational efficiency. The system may reduce cargo loss, improve logistics operations, and enhance transparency among stakeholders.

Hereinafter, a cargo monitoring service sharing device via wired and wireless communication between a vehicle and a trailer will be described with reference to FIG. 1.

FIG. 1 shows an example of a vehicle, a trailer, a server, a management computer and a user device that perform wired and wireless communication and have a cargo monitoring service sharing device according to an example of the present disclosure.

As for each of the components, first, a vehicle 100 is a device that relays communication between a server 111 and a trailer 102, and the vehicle and the server or the vehicle and the trailer may communicate each other in various manners. The vehicle may include a controller according to an example of the present disclosure and an existing controller, and the trailer may include a controller according to an example of the present disclosure and an existing controller. In addition, the trailer 102 may be loaded with various cargoes 109. Herein, in the vehicle 100, an integrated vehicle controller including the existing controller 103 and the controller 101 according to the present disclosure may be configured. In addition, in the trailer 102, an integrated trailer controller including the existing controller 107 and the controller 103 according to the present disclosure may be configured. In this regard, in an example according to the present disclosure, a vehicle controller may mean the integrated vehicle controller or the controller 101 according to the present disclosure, and a trailer controller may mean the integrated trailer controller or the controller

105 according to the present disclosure. Hereinafter, for convenience of explanation, the terms 'vehicle controller' and 'trailer controller' will be used.

A vehicle controller and a trailer controller may be connected using wired/wireless communication, perform an interface function, and control existing controllers.

The vehicle controller and the trailer controller may control and manipulate various systems between a vehicle and a trailer and download or share software for exchanging data or performing a service via connection. The vehicle and the trailer may assume a physical connection and be connected via wired/wireless communication based on the physical connection.

Specifically, hereinafter, a service performed by downloading software will be described as cargo monitoring for preventing loss of a cargo of a trailer.

In this case, the vehicle 100, the trailer 102 and the server 111 may be connected via wired and wireless communication, and the vehicle and an external device 112 may also be connected via wired and wireless communication. For example, wireless communication such as Bluetooth and Wi-Fi may be used. The external device 112 may be a user device, and for example, a user may include a driver, a manager, and a consumer.

In addition, the server 111 and the management computer 113 may also be connected via wired and wireless communication. Herein, the management computer may mean a computer of a fleet company that is specialized in managing vehicles or equipment. Fleet companies may assist vehicle management in companies that possess and operate mainly a large trailer fleet, that is, many vehicles.

If a cargo is lost during delivery, a trailer controller may check whether the cargo has deviated from a designated location through communication capable of identifying a current state of the cargo such as radio frequency (RF) communication. The trailer controller may transmit information regarding whether the cargo has deviated from the location to a vehicle controller via wired and wireless communication, and the vehicle controller may transmit a warning message to a user's smart device so that the user may know it. Herein, the user may correspond to a vehicle driver like a cargo truck driver. In addition, the deviation information of the cargo may also be transmitted to a server, and the management computer may identify a current situation through communication with the server and take a follow-up measure.

A vehicle may be implemented as an autonomous vehicle and carry a trailer between hubs. For example, the vehicle may be a tractor that is a type of vehicle performing a specific function. In addition, the trailer may be an example belonging to a cargo that is a means of carrying freight or goods.

Figure 2:
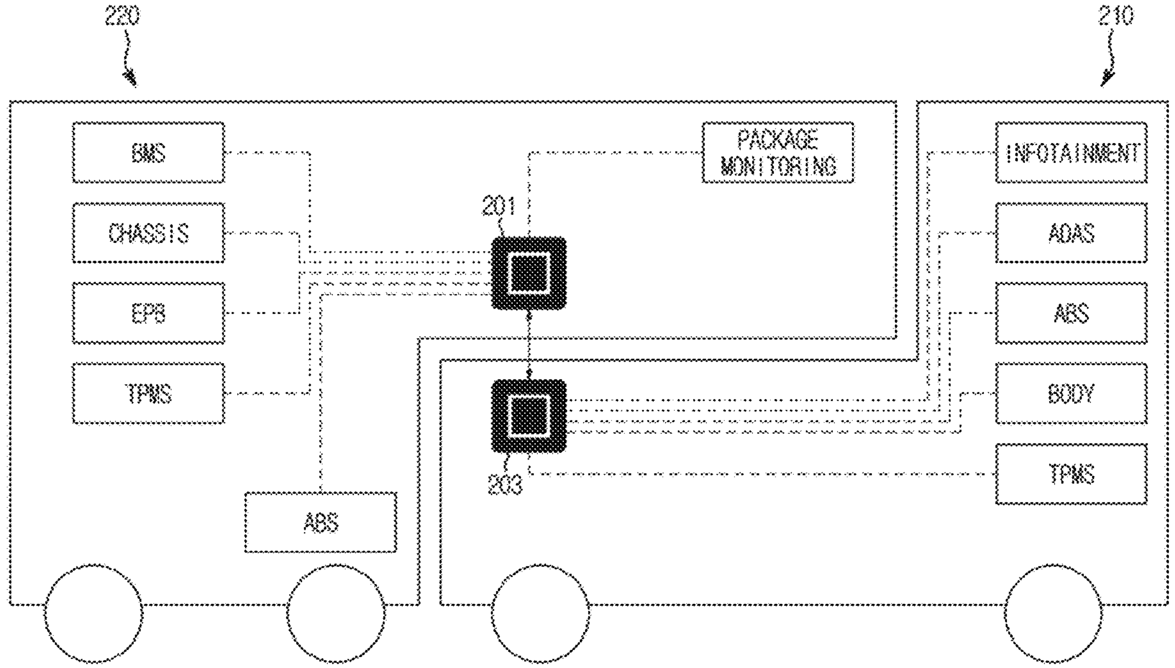
FIG. 2 shows an example of internal structures of a vehicle and a trailer according to another example of the present disclosure.

FIG. 2 shows an example of internal structures of a vehicle 210 and a trailer 220 according to an example of the present disclosure. Referring to FIG. 2, a method for sharing a service between a vehicle and a trailer according to the present disclosure may have comprehensive understanding about communication between a vehicle controller 203 and a trailer controller 201 and communication between the vehicle controller and multiple existing controllers of the trailer controller.

Specifically, each of the vehicle controller 203 and the trailer controller 201 may exchange or share software for performing various functions. A vehicle controller may have wired/wireless communication with a server, receive software from the server via communication and store the software in a memory of the vehicle controller.

The vehicle controller 203 and the trailer controller 201 may exchange information and stored software via communication, and each of the controllers may extract and use suitable information for a desired service.

In addition, when a vehicle and a trailer use software, the software may be separately updated for each service. A vehicle controller and a trailer controller may be installed in a vehicle and a trailer respectively, and thus separately updated software may be controlled and operated. Various software may be provided from an outside region to a trailer through a vehicle controller and a trailer controller, and it is possible to use software capable of providing various services by reflecting users' demands.

This may be a structure in which software performing functions of a vehicle and a trailer are stored in memories of a vehicle controller and a trailer controller and become services, and thus the vehicle controller and the trailer controller give and take information via bidirectional communication between the vehicle and the trailer.

A vehicle controller may control existing functions by being connected with existing controllers via wired/wireless communication. For example, the existing functions of a vehicle may include infotainment corresponding to a vehicle information and entertainment system, advanced driver assistance systems (ADAS) for assisting a driver, an anti-lock braking system (ABS), which is a system for preventing the braking effect, BODY, which is a concept encompassing a car body that is the main structural part of a car, internal and external panels, doors and windows, and a tire pressure monitoring system (TPMS) for monitoring air pressure of tire.

In addition, like the vehicle controller, a trailer controller may also control existing functions of a trailer by being connected with the existing functions. For example, the existing functions of a trailer may include a battery management system (BMS), chassis, an electronic parking brake (EPB), a TPMS, and an ABS.

According to an example of the present disclosure, among the above functions, a cargo monitoring system may be controlled via wired and wireless communication between a vehicle controller and a trailer controller. The cargo monitoring system may perform loss prevention monitoring for cargoes. The loss prevention monitoring for cargoes may include cargo inquiry monitoring or cargo loss event detection monitoring in a trailer.

Figure 3:
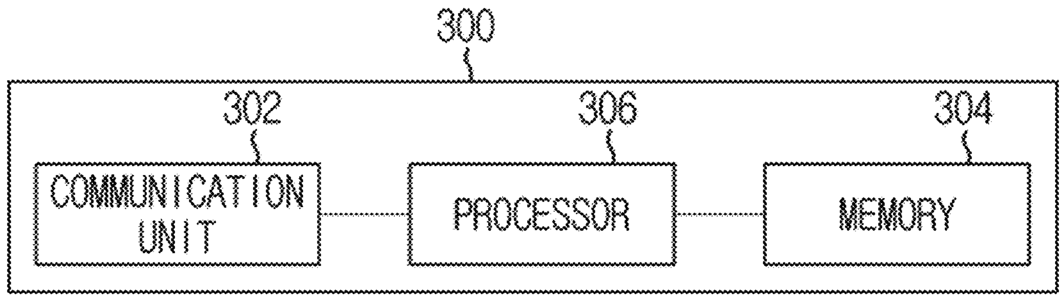
FIG. 3 shows an example of general modules constituting a vehicle, a trailer and a server according to another example of the present disclosure.

FIG. 3 shows an example of a general module 300 constituting a server, a vehicle or a trailer according to another example of the present disclosure.

The server, the vehicle and the trailer may commonly include a communication unit 302, a processor 305 and a memory 304. The communication unit 302 may be a communication module that is used to exchange information with a vehicle, a trailer or a server. The communication unit may use wired/wireless communication. For example, wireless communication such as Bluetooth and Wi-Fi are mainly used between a vehicle controller and a trailer controller, and wired/wireless communication such as CAN, LIN and Ethernet may be used between the trailer controller and an existing controller in a trailer. However, this is merely one example, and another type of wired/wireless communication may be used.

The memory may receive and store at least one or more pieces of software for providing various functions in a vehicle and a trailer. For example, the processor may mean a comprehensive processor including the vehicle controller and the trailer controller. In addition, the processor may be a device that implements an operation of the server according to an example of the present disclosure.

The vehicle controller and the trailer controller may exchange information between the vehicle and the trailer by being connected via wired/wireless communication, deliver various functions to be provided to a user, and provide a useful service. The vehicle controller may request trailer information to the trailer and receive information of the trailer. The vehicle controller may communicate with the server to transmit vehicle information and the obtained trailer information.

In relation to the above-described processing of the processor among the server, the vehicle and the trailer, a cargo monitoring process for cargo loss prevention will be described in detail through FIG. 4 below.

Figure 4:
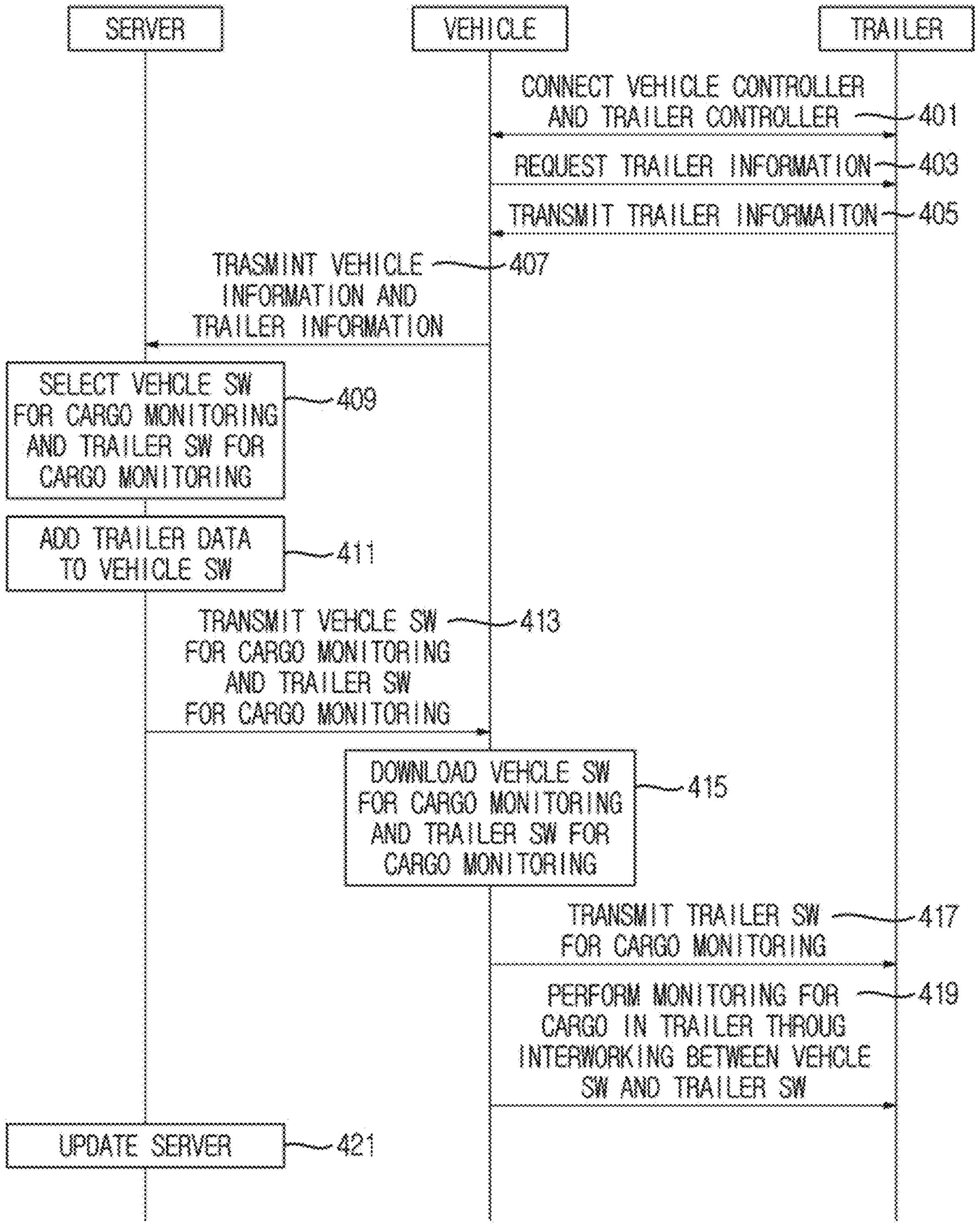
FIG. 4 shows an example of a method for preventing cargo loss in a trailer through service sharing between a vehicle and the trailer according to another example of the present disclosure.

FIG. 4 shows an example of a method for preventing cargo loss in a trailer through service sharing between a vehicle and the trailer according to another example of the present disclosure.

Referring to FIG. 4, in relation to a method for sharing a monitoring service for cargo loss prevention between a vehicle and a trailer according to an example of the present disclosure, an operation process among a server, the vehicle and the trailer may be known. First, the vehicle and the trailer may connect each controller via wired/wireless communication (401). Specifically, the controller may include various existing controllers in each of the vehicle and the trailer and also control the controllers. In this regard, step S401 may be performed after the vehicle and the trailer are physically combined with each other. That is, after physical combination, a vehicle controller and a trailer controller may be connected with each other via wired/wireless communication.

Next, the vehicle may request trailer information to the trailer (403), and the trailer may transmit the trailer information requested from the vehicle (405). The vehicle may transmit vehicle information and the trailer information to the server (407).

The requesting of the trailer information (403) and the transmitting of the requested trailer information (405) may be performed in a predetermined format according to standardized information. For example, the trailer information may include a trailer number, a maximum load amount, an overload state, a vehicle speed, a battery state of charge (SOC), a current location, a departure point, and a destination. The vehicle information may include a vehicle number, a vehicle speed, a battery SOC, a current location, a departure point, and a destination.

Specifically, the trailer controller may have a camera sensor capable of identifying a delivered cargo, a weight estimation sensor, a RF module, and the like, and information on the delivered cargo may be identified through these sensors. For example, information on a delivered cargo may include a type of the delivered cargo, the number of the delivered cargo, a delivery destination, and an expected cargo weight.

In addition, the trailer controller may forward loss information to the vehicle controller based on a GPS sensor capable of identifying location information in the event of a lost cargo. The trailer controller may transmit a warning message also to a user's smart device so that the user may perceive the loss of the cargo, and the trailer controller may also forward the loss information to the server so that the server may execute custom response through the management computer.

The server may transmit information on a vehicle driver and information on a cargo to be delivered to the vehicle controller through the processor. Herein, the vehicle controller may store information on a delivered cargo according to each delivery destination.

Accordingly, based on the transmitted information, the server may select vehicle software for cargo monitoring (hereinafter, vehicle software) and trailer software for cargo monitoring (hereinafter, trailer software) that are applicable to and available in the vehicle and the trailer (409). In this case, software selected by the server may be software for cargo monitoring stored in the database of the server. In case there is no software used for cargo monitoring in the database of the server, software may be received from a third party outside the server.

Before the selected vehicle software and the selected trailer software, the server may add information on the trailer only to the vehicle software (411). Because the vehicle transmits the trailer software to the trailer after both the vehicle software and the trailer software are downloaded into the memory of the vehicle controller, the trailer information, which the trailer may request, may be added to the vehicle software. However, when an example according to the present disclosure is applied, step S411 may be excluded. However, if step S411 is added, it may be expected that a service may be smoothly shared between the vehicle and the trailer by adding the trailer information to the vehicle software. For example, a service may be smoothly provided by providing information on the weight, type and size of a cargo beforehand.

In addition, the server may transmit the selected vehicle software and the selected trailer software to the vehicle first. The vehicle may duplex a memory to stabilize a system and download the trailer software as well as the vehicle software into the duplexed memory. The trailer may receive the trailer software from the vehicle (417).

The trailer may perform monitoring for a cargo in the trailer through interworking between the vehicle software and the trailer software (419). The monitoring for a cargo in the trailer may include cargo inquiry monitoring and/or cargo loss event detection monitoring in the trailer. In addition, according to the operation of the trailer software, a service for route optimization according to a cargo destination may be included.

After step S419, the trailer may determine whether the delivery of a cargo is completed according to whether a signal is generated from the vehicle regarding at least one of the open/close of a trailer door, the departure of the vehicle, or a navigation destination. Herein, the server may update server data stored in the server by comparing data in the vehicle controller and data in the trailer controller (421).

Figure 5:
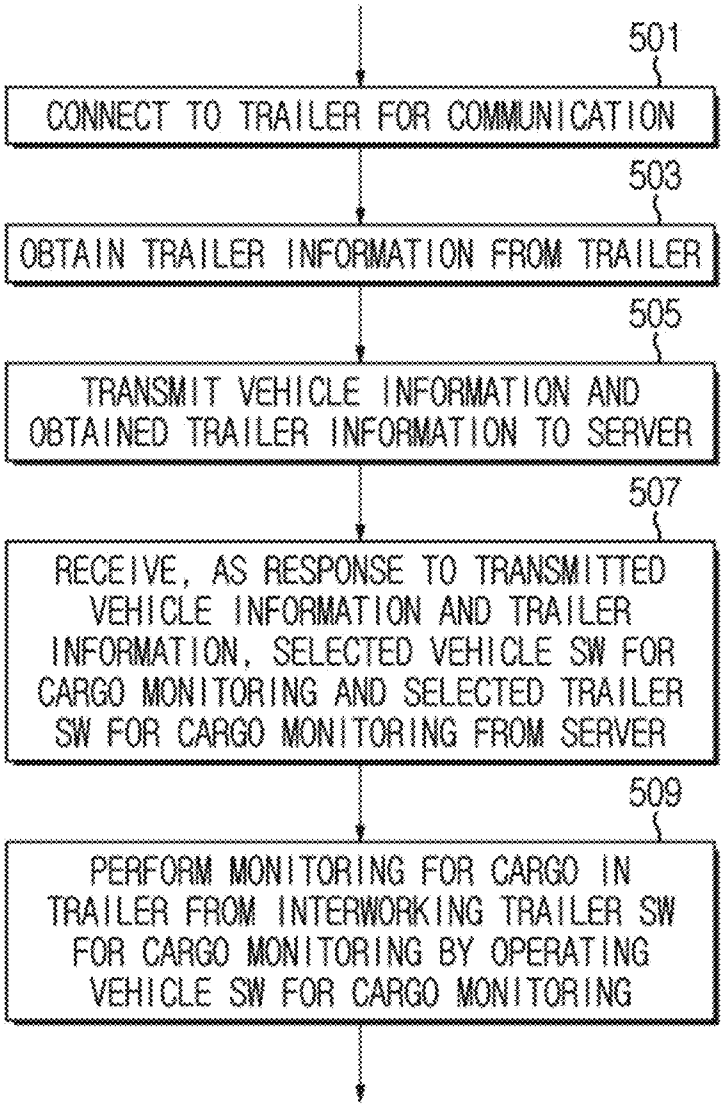
FIG. 5 shows an example of a method for sharing a cargo monitoring service for preventing cargo loss between a vehicle and a trailer, which is implemented in the vehicle according to another example of the present disclosure.

FIG. 5 shows an example of a method for sharing a cargo monitoring service for preventing cargo loss between a vehicle and a trailer, which is implemented in the vehicle according to another example of the present disclosure.

Referring to FIG. 5, a method for sharing a cargo monitoring service for cargo loss prevention between a vehicle and a trailer, which is implemented in the vehicle according to the present disclosure, may include connecting to the trailer for communication (501), obtaining trailer information from the trailer (503), transmitting vehicle information and the obtained trailer information to a server (505), receiving, as a response to the transmitted vehicle information and the transmitted trailer information, selected vehicle software for cargo monitoring and selected trailer software for cargo monitoring from the server (507), and performing monitoring for a cargo in the trailer from the interworking trailer software for cargo monitoring by operating the vehicle software for cargo monitoring (509).

According to step S501, the connecting to the trailer for communication may be performed by using wired/wireless communication for a vehicle controller and a trailer controller. For example, wireless communication like Bluetooth and Wi-Fi may be used.

In addition, according to step S503, the obtaining of the trailer information from the trailer may obtain the information at a request of the vehicle controller. As the trailer itself is not capable of transmitting the trailer information to the server, the information may be forwarded through the vehicle controller. According to step S505, the vehicle may transmit the vehicle information and the obtained trailer information to the server.

According to step S507, in the receiving of as a response to the transmitted vehicle information and the transmitted trailer information, the selected vehicle software for cargo monitoring and the selected trailer software for cargo monitoring from the server, the server may select the software for providing the service for cargo loss prevention and transmit the software to the vehicle and the trailer respectively.

The software for cargo loss prevention may include software for the cargo inquiry monitoring or cargo loss event detection monitoring in the trailer. A detailed operation process of the software for the cargo inquiry monitoring or cargo loss event detection monitoring in the trailer will be described in detail through FIG. 10 and FIG. 11 below.

According to step S509, the performing of the monitoring for a cargo in the trailer from the interworking trailer software for cargo monitoring by operating the vehicle software for cargo monitoring may check whether the cargo is loss during delivery and take a follow-up measure. During delivery, the trailer controller may check a state of a cargo through RF communication. In case a cargo deviates from a designated location, the trailer controller may identify and transmit deviation information to the vehicle controller via wired and wireless communication.

Figure 6:
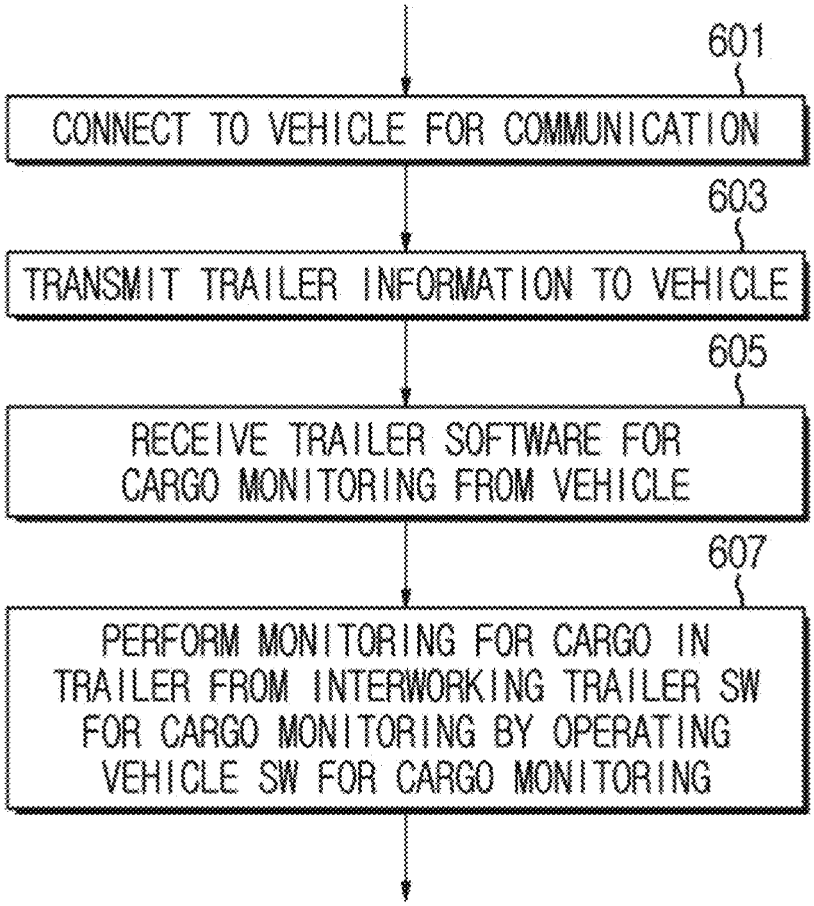
FIG. 6 shows an example of a method for sharing a cargo monitoring service for preventing cargo loss between a vehicle and a trailer, which is implemented in the trailer according to another example of the present disclosure.

FIG. 6 shows an example of a method for sharing a cargo monitoring service for preventing cargo loss between a vehicle and a trailer, which is implemented in the trailer according to another example of the present disclosure.

Referring to FIG. 6, a method for sharing a cargo monitoring service for cargo loss prevention between a vehicle and a trailer, which is implemented in the trailer according to the present disclosure, may include connecting to the vehicle for communication (601), transmitting trailer information to the vehicle (603), receiving trailer software for cargo monitoring from the vehicle (605), and performing monitoring for a cargo in the trailer from the interworking trailer software for cargo monitoring by operating vehicle software for cargo monitoring (607).

First, according to step S601, the connecting to the vehicle for communication may be performed by using wired/wireless communication for a vehicle controller and a trailer controller. Through connection between each integrated controller, vehicle information and the trailer information used in a server, the vehicle and the trailer may be requested and exchanged.

In addition, according to step S603, the transmitting of the trailer information to the vehicle may transmit the trailer information as used by the server or the vehicle from the trailer to the vehicle because the trailer is not capable of performing communication with the server.

According to step S605, like step S603, the receiving of the trailer software from the vehicle may receive the trailer software from the vehicle, which had been transmitted from the server, because the trailer is incapable of performing communication with the server. Herein, the received trailer software may correspond to trailer software for cargo monitoring selected by the server based on the vehicle information and the trailer information that are transmitted from the vehicle to the server.

Figure 7:
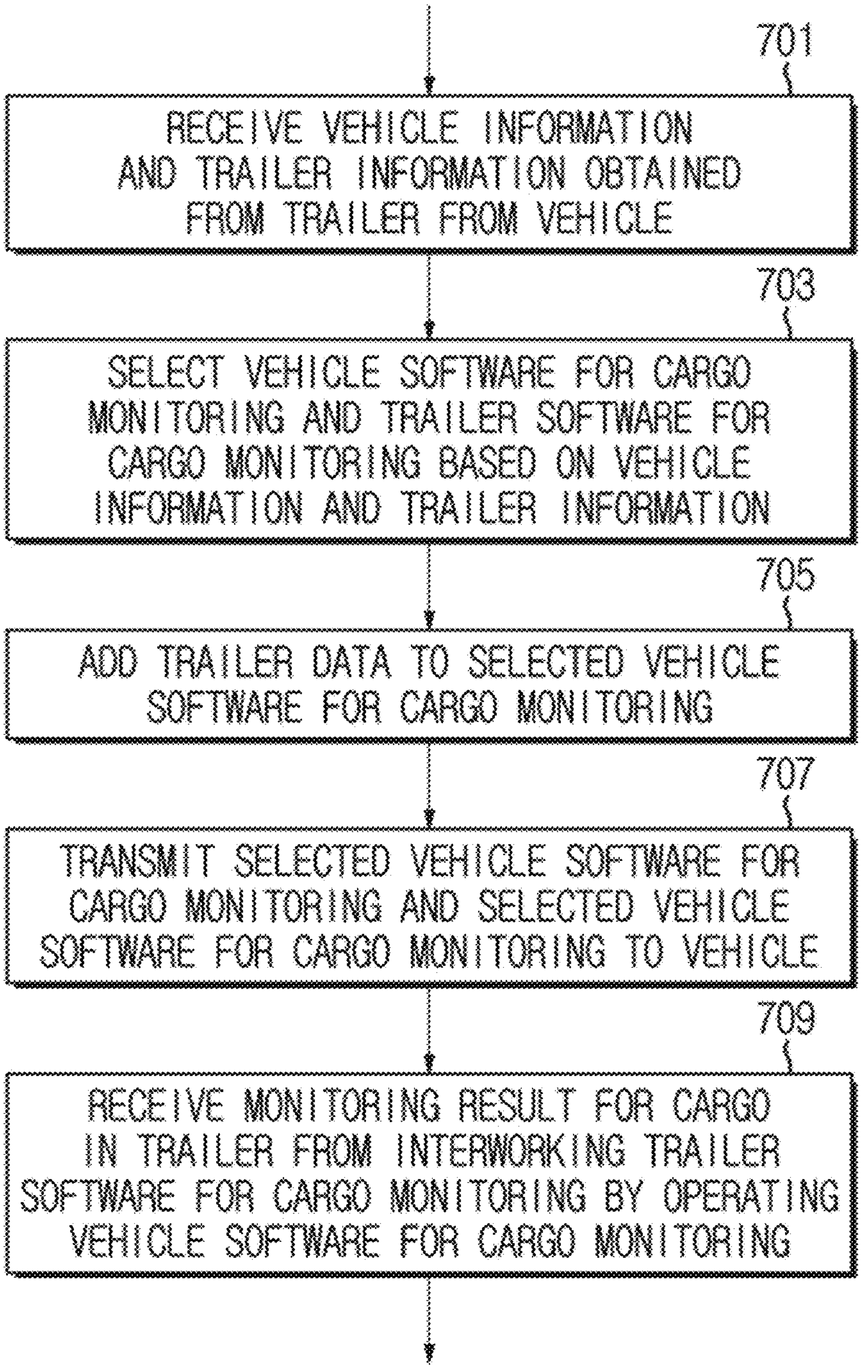
FIG. 7 shows an example of a method for sharing a cargo monitoring service for preventing cargo loss between a vehicle and a trailer, which is implemented in a server according to another example of the present disclosure.

FIG. 7 shows an example of a method for sharing a cargo monitoring service for preventing cargo loss between a vehicle and a trailer, which is implemented in a server according to another example of the present disclosure.

Referring to FIG. 7, a method for sharing a cargo monitoring service for cargo loss prevention between a vehicle and a trailer, which is implemented in a server according to the present disclosure, may include receiving, from the vehicle, vehicle information and trailer information obtained from the trailer (701), selecting vehicle software for cargo monitoring and trailer software for cargo monitoring based on the vehicle information and the trailer information (703), adding trailer data to the selected vehicle software for cargo monitoring (705), transmitting the selected vehicle software for cargo monitoring and the selected vehicle software for cargo monitoring to the vehicle (707), and receiving a monitoring result for a cargo in the trailer from the interworking trailer software for cargo monitoring by operating the vehicle software for cargo monitoring (709).

First, according to step S701, the receiving of the vehicle information and the trailer information obtained from the trailer from the vehicle may be performed by a vehicle controller and the server that are connected through wired and wireless communication. The server may not perform communication directly with a trailer controller but obtain the vehicle information and the trailer information from the vehicle controller.

According to step S703, the selecting of the vehicle software for cargo monitoring and the trailer software for cargo monitoring based on the vehicle information and the trailer information may perform a function of inquiring a cargo or detecting an event of cargo loss through cargo monitoring for cargo loss prevention in the vehicle and the trailer based on the received vehicle and trailer information.

In addition, according to step S705, the adding of the trailer data to the selected vehicle software for cargo monitoring may add the data when the server or the vehicle requests data to the trailer first. Likewise, vehicle data may be added to the trailer software when the trailer requests the vehicle data as desired.

According to step S707, the transmitting of the selected vehicle software for cargo monitoring and the selected trailer software for cargo monitoring to the vehicle may transmit both the vehicle software and the trailer software from the server to the vehicle because the server may communicate directly with the vehicle but communicate with the trailer through the vehicle. Then, the vehicle may transmit the trailer software to the trailer.

According to step S709, in the receiving of the monitoring result for the cargo in the trailer from the interworking trailer software for cargo monitoring by operating the vehicle software for cargo monitoring, the vehicle controller and the trailer controller may be connected with each other via wired and wireless communication, and thus the vehicle controller may control trailer controller information, and the trailer controller may also be given authority to control the vehicle. Thus, the sever may control the vehicle and the trailer through the vehicle controller without direct communication connection to the trailer controller.

Figure 8:
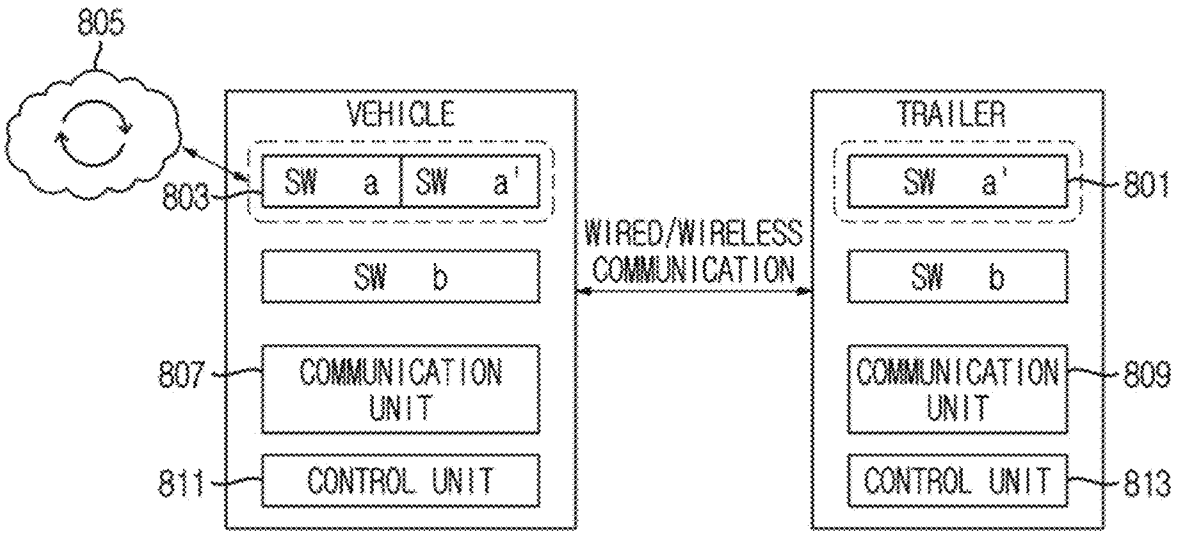
FIG. 8 shows an example of an overall configuration of a server, a vehicle and a trailer according to another example of the present disclosure.

FIG. 8 shows an example of an overall configuration of a server, a vehicle and a trailer according to another example of the present disclosure.

Referring to FIG. 8, the vehicle may consist of a memory, a communication unit, and a control unit, and the trailer may also consist of a memory, a communication unit, and a control unit. In both the vehicle and the trailer, not only the communication unit but also each of the other components may perform transmission and reception via wired/wireless communication. However, there may be differences in a configuration of a memory and whether direct communication is possible.

First, the operation structure and operation principle of a general controller will be described. Generally, a controller is configured as hardware for controlling an electronic device and may be commonly referred to as an electronic control unit (ECU) in a vehicle. However, it may not operate by hardware, but software may have to be added to operate a peripheral device. If multiple pieces of software are added, complexity of the software may increase. To solve this problem, middleware may be configured to manage communication between software and hardware via a network between them.

As for the configuration of a memory, a memory 801 of the trailer is a single memory and store one piece of software. On the other hand, the memory 803 of the vehicle may be duplexed, and at least one or more pieces of software may be stored simultaneously. For example, the memory 803 of the vehicle may be duplexed and download both vehicle SW a and trailer SW a'. The trailer SW a' may be transmitted from a vehicle controller memory to a trailer controller memory via wired/wireless communication between the vehicle and the trailer and be stored therein. Herein, the vehicle SW a and the trailer SW a' correspond to cargo monitoring software for cargo loss prevention.

In addition, according to an example of the present disclosure, a communication unit 807 of the vehicle may perform direct communication with the server, and the vehicle may receive both selected vehicle software and selected trailer software from the server. On the other hand, a communication unit 809 of the trailer may not perform direct communication with the server and receive the selected trailer software from the server via wired/wireless communication with the vehicle. In this regard, the communication unit 809 of the trailer may not perform direct communication with the server 805 according to an example of the present disclosure, but it may perform direct communication with the server 805 in the general information transmission and reception of the related art not according to an example of the present disclosure.

Figure 9A:
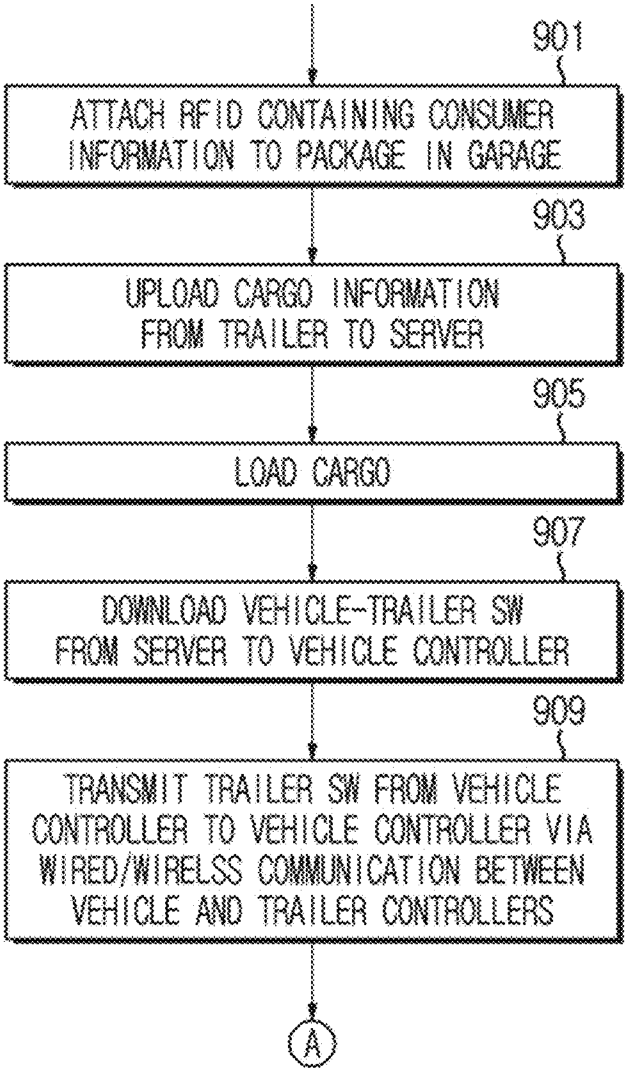
FIG. 9A and FIG. 9B show an example of an internal operation process for preventing cargo loss in a vehicle and a trailer according to another example of the present disclosure.
Figure 9B:
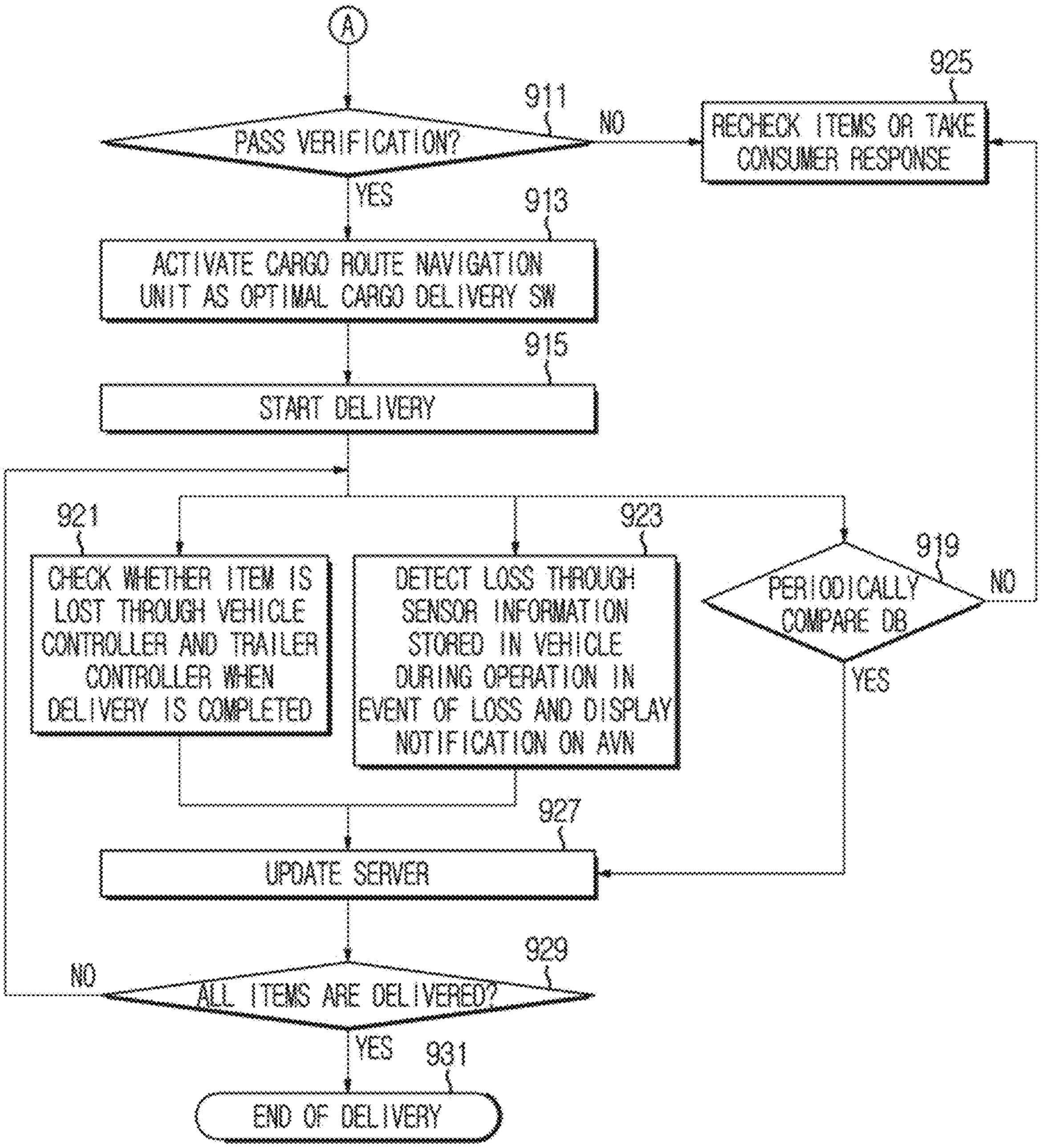

FIG. 9A and FIG. 9B show an example of an internal operation process for preventing cargo loss in a vehicle and a trailer according to another example of the present disclosure.

Referring to FIG. 9A and FIG. 9B, a process of forwarding software for cargo monitoring selected from a server and storing in a vehicle and a trailer may be described in detail. First, a radio frequency identification (RFID) containing consumer information may be attached to a package in a garage (901). RFID is a technology of identifying and tracking an object or a living thing by using radio frequency, and a RFID system may usually consist of a RFID tag and a RFID reader. A RFID tag is a small device attached to an object and may contain unique identification information. A RFID reader may receive a signal from a RFID tag and read information of the tag.

Information on a delivered cargo may be received through a camera sensor, a weight estimation sensor and a RF module, which are capable of obtaining information on a truck driver from an external device and information on a delivered cargo from a trailer controller. For example, information on a truck driver may include location information and the driver's company, and information on a delivered cargo may include a type of the delivered cargo, the number of the cargo, a delivery destination, and an expected cargo weight. In addition, an external device may be a user device, and a user may include a driver, a manager, and a consumer.

The above information on cargoes with RFID tags attached on them may be upload from the trailer to a server (903), and the cargoes may be loaded into the trailer (905). Based on the loaded cargoes, the server may select software for cargo monitoring, and a vehicle controller may download vehicle software and trailer software from the server (907).

The vehicle controller and a trailer controller may be connected with each other via wired and wireless communication, and the trailer software may be transmitted from the vehicle controller to the trailer controller. Next, the server may perform a verification process to compare an uploaded database of the cargoes and a database of the cargoes stored in the trailer controller (911).

After the verification is satisfactory, when software for cargo monitoring is being operated, a navigation unit of the vehicle may be activated to search for an optimized cargo delivery route (913). Delivery may start according to the optimized cargo delivery route that is uploaded to the navigation unit of the vehicle (915). Even after the delivery starts, the cargo database stored in the server and the cargo database stored in the trailer may be periodically compared (919). On the other hand, if the verification is not satisfactory, the cargoes loaded into the trailer may be checked again, or a consumer response corresponding to cargo loss may be immediately taken (925).

When the periodical comparison of the databases between the server and the trailer is performed, the server database may be updated (925). On the other hand, if the periodical comparison is not performed, like if the verification is not satisfactory, the cargoes loaded into the trailer may be checked again, or a consumer response corresponding to cargo loss may be immediately taken (925).

After the cargo delivery starts, a different process may be performed according to whether a cargo is lost or is completely delivered. If the cargo is completely delivered, whether the cargo is lost may be checked through the vehicle controller and the trailer controller (921). That is, as the vehicle controller and the trailer controller are connected with each other via wired and wireless communication, loss prevention monitoring for the cargoes in the trailer may be performed by operating the vehicle software interworking with the trailer software. If there is no abnormality in a monitoring result, the completion of delivery may be processed. On the other hand, if the cargo is lost, the event of loss may be detected through sensor information stored in the running vehicle, and a notification may be displayed on an audio video navigation (AVN) unit. Herein, the AVN unit may be a multimedia system mounted in the vehicle (923).

In addition, if the delivery is completed, information on completely delivered cargoes may be updated in the server (925). If all the cargoes loaded in the trailer are delivered (929), the delivery may end (931).

Figure 10:
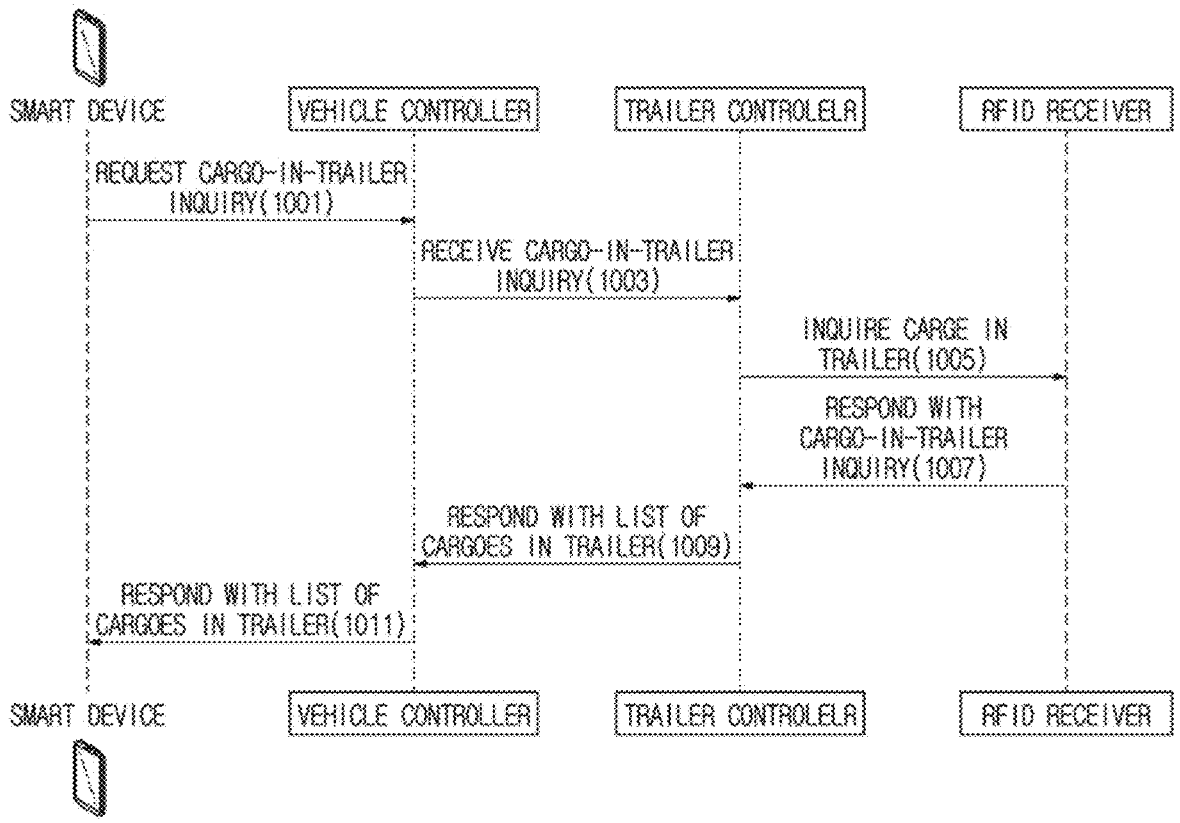
FIG. 10 shows an example of an operation process among a vehicle controller, a trailer controller, an external device and a RFID receiver, which perform inquiry monitoring about a cargo in a trailer according to another example of the present disclosure.

FIG. 10 shows an example of an operation process among a vehicle controller, a trailer controller, a user's smart device and a RFID receiver, which perform inquiry monitoring about a cargo in a trailer according to another example of the present disclosure.

Referring to FIG. 10, a process of cargo inquiry monitoring, which is one type of cargo loss prevention monitoring, may be performed by using a user's smart device among a vehicle controller, a trailer controller, and a RFID receiver.

A cargo-in-the trailer inquiry monitoring service may include receiving a cargo-in-the trailer inquiry request from the user's smart device (1001), transmitting the cargo-in-the trailer inquiry request to the trailer (1003), inquiring the cargo in the trailer from the trailer controller to the RFID receiver (1005), responding, by the RFID receiver, to the trailer controller by a list of cargoes in the trailer (1007), responding, by the trailer controller, to the vehicle controller by the list of cargoes in the trailer (1009), and responding, by the vehicle, to the user's smart device by the list of cargoes in the trailer (1011).

According to step S1001 and step S1003, the vehicle controller may receive the cargo-in-the trailer inquiry request from the user's smart device and request an inquiry by forwarding the request to the trailer controller. The user may identify a type of cargoes currently remaining in the trailer and the number of the cargoes by using an item inquiry through the smart device and thus be provided with an optimized route recommendation service.

In addition, according to step S1005 and step S1007, the inquiring of the cargo in the trailer from the trailer controller to the RFID receiver and the responding, by the RFID receiver, to the trailer controller by a list of cargoes in the trailer may be performed by using RFID tags that are attached before cargoes are loaded into the trailer.

Specifically, the RFID receiver is an essential component of a RFID system and is a device capable of receiving a signal from a RFID tag and reading information. The RFID receiver may usually have wireless communication with a RFID tag, and the receiver may transmit radio waves, interact with a tag and receive a response signal transmitted from the tag. That is, the RFID receiver may perform steps S1005 and S1007 based on RFID tags that were attached to cargoes in a garage before the cargoes were loaded into the trailer.

In addition, according to step S1009, the responding, by the trailer controller, to the vehicle controller by the list of cargoes in the trailer may transmit information used for performing the service via wired/wireless communication connection between the vehicle controller and the trailer controller. That is, for bi-directional control between the vehicle and the trailer, the trailer controller may link information stored in existing controllers to a controller according to the present disclosure so that the vehicle controller may control the information. The vehicle controller may also provide the tailer controller with authority to control RPM and the like in the vehicle.

According to step S1011, the responding, by the vehicle, to the user's smart device by the list of cargoes in the trailer may connect the server and the user's smart device via wired and wireless communication and monitor and control the electronic devices and the software for cargo monitoring of the trailer.

The vehicle controller and the trailer controller, which perform the cargo-in-the trailer inquiry monitoring service, may be connected by a same monitoring system.

Figure 11:
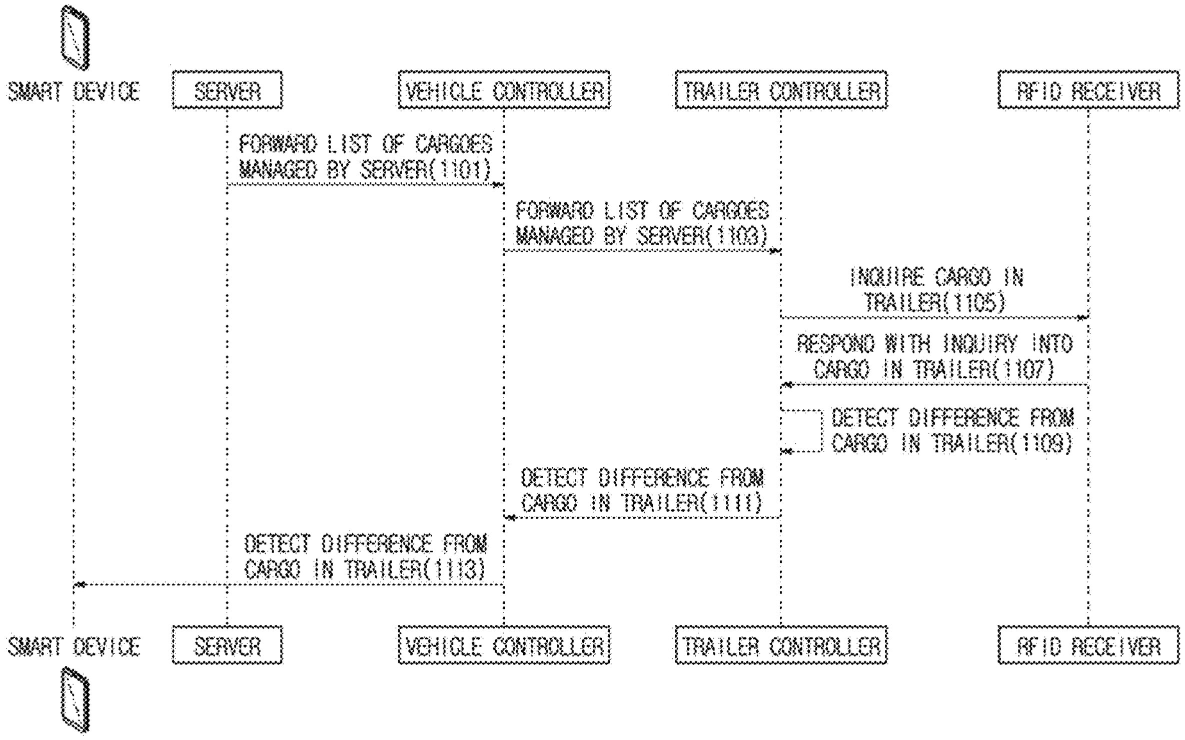
FIG. 11 shows an example of an operation process among a vehicle controller, a trailer controller, a server, an external device and a RFID receiver, which perform loss event detection monitoring about a cargo in a trailer according to another example of the present disclosure.

FIG. 11 shows an example of an operation process among a vehicle controller, a trailer controller, a server, a user's smart device and a RFID receiver, which perform loss event detection monitoring for a cargo in a trailer according to another example of the present disclosure.

Referring to FIG. 11, a process of cargo loss event detection monitoring, which is one type of cargo loss prevention monitoring, may be performed by using a user's smart device and a server among a vehicle controller, a trailer controller, and a RFID receiver.

A cargo-in-the trailer loss event detection monitoring service may include forwarding a list of cargoes managed in the server from the server to the vehicle controller (1101), forwarding the list of cargoes managed in the server from the vehicle controller to the trailer controller (1103), inquiring a cargo in the trailer from the trailer controller to the RFID receiver (1105), responding, by the RFID receiver, to the trailer controller by a list of cargoes in the trailer (1107), detecting, by the trailer controller, whether there is a difference from items in the trailer controller (1109), transmitting a notification about an event of difference from the items in the trailer from the trailer controller to the vehicle controller (1111), and transmitting the notification about the event of difference from the items in the trailer from the vehicle controller to the user's smart device (1113).

According to step S1101 and step S1103, the forwarding of the list of cargoes managed in the server from the server to the vehicle controller and the forwarding of the list from the vehicle controller to the trailer controller may be performed to compare a list of cargoes stored in a server database and a list of cargoes stored in a trailer controller database.

In addition, according to step S1105 and step S1107, the inquiring of the cargo in the trailer from the trailer controller to the RFID receiver and the responding, by the RFID receiver, to the trailer controller by the list of cargoes in the trailer may be performed to compare in the trailer controller the list of cargoes managed by the server, which is forwarded from the vehicle controller, and a list of cargoes in the tailer that is obtained through communication with the RFID receiver. That is, the trailer controller may perform verification about whether a cargo is lost by detecting a difference through comparison between respective lists.

According to step S1109, the detecting of whether there is a difference from items in the trailer controller by the trailer controller may check a state of a cargo through RF communication in the trailer controller if the cargo is lost during delivery and identify and transmit information on the deviation of the cargo from a designated location to the vehicle controller via wired and wireless communication.

According to step S1111 and step S1113, the transmitting of the notification about the event of difference from the items in the trailer from the trailer controller to the vehicle controller and the generating and transmitting of the notification about the event of difference from the items in the trailer from the vehicle controller to the user's smart device may detect, by the trailer controller, a difference by comparing the list of cargoes managed by the server and the list of cargoes in the trailer and generate the notification about the event of difference of cargoes. The vehicle controller, which receives the generated notification, may transmit a warning message to a cluster or the user's smart device so that the user may know it. The cluster may be replaced by a device that provides information that enables a driver to monitor the state and performance of the vehicle. Then, the vehicle controller may also transmit the notification to the server so that a management computer may identify a current situation and take a follow-up measure.

The present disclosure is technically directed to providing a method and device for sharing a cargo monitoring service between a vehicle and a trailer through a communication link between the vehicle and the trailer.

In addition, to solve technical problems of the present disclosure, the present disclosure is directed to providing a system that consists of a vehicle, a trailer and a server and implements a method and device for sharing a service for preventing cargo loss.

The technical problems solved by the present disclosure are not limited to the above technical problems and other technical problems which are not described herein will be clearly understood by a person having ordinary skill in the technical field, to which the present disclosure belongs, from the following description.

According to the present disclosure, a method is provided for preventing cargo loss in a trailer through service sharing between a vehicle and the trailer. The method may comprising: connecting to the trailer for communication, obtaining trailer information from the trailer, transmitting vehicle information and the obtained trailer information to a server, receiving as a response to the transmitted vehicle information and the transmitted trailer information, selected vehicle software for cargo monitoring and selected trailer software for cargo monitoring from the server, transmitting the trailer software for cargo monitoring to the trailer and performing loss prevention monitoring for a cargo in the trailer by operating the vehicle software for cargo monitoring that interworks with the trailer software for cargo monitoring.

According to an example of the method of the present disclosure, the loss prevention monitoring for the cargo in the trailer includes cargo inquiry monitoring and/or cargo loss event detection monitoring in the trailer.

According to an example of the method of the present disclosure, the method, further comprising performing route optimization according to a cargo destination based on operation of the trailer software for cargo monitoring.

According to an example of the method of the present disclosure, the cargo inquiry monitoring in the trailer comprises, receiving an inquiry request for a cargo in the trailer from an external device, transmitting the inquiry request for the cargo in the trailer to the trailer, receiving a response about an inquiry into the cargo in the trailer from the trailer and sending, as a response, a cargo list in the trailer to the external device.

According to an example of the method of the present disclosure, the cargo loss event detection monitoring in the trailer comprises: receiving a cargo list managed by the server from the server, forwarding the cargo list managed by the server to the trailer, receiving a response about an inquiry into the cargo in the trailer from the trailer, receiving an alert of a cargo difference in the trailer from the trailer and forwarding the alert of the cargo difference in the trailer to an external device.

According to the present disclosure, a method is provided for preventing cargo loss in a trailer through service sharing between a vehicle and the trailer, which is implemented by the trailer. The method may comprise: connecting to the vehicle for communication, transmitting trailer information to the vehicle, receiving trailer software for cargo monitoring from the vehicle, wherein the received trailer software for cargo monitoring corresponds to software selected by a server based on vehicle information and trailer information that are transmitted by the vehicle to the server and performing loss prevention monitoring for a cargo in the trailer by operating the trailer software for cargo monitoring that interworks with vehicle software for cargo monitoring.

According to an example of the method of the present disclosure, the loss prevention monitoring for the cargo in the trailer includes cargo inquiry monitoring and/or cargo loss event detection monitoring in the trailer.

According to an example of the method of the present disclosure, the cargo inquiry monitoring in the trailer comprises, receiving an inquiry request for the cargo in the trailer from the vehicle, receiving a response about an inquiry into the cargo in the trailer from a RFID receiver of the cargo and sending, as a response, a cargo list in the trailer to the vehicle.

According to an example of the method of the present disclosure, the cargo loss event detection monitoring in the trailer comprises, receiving a cargo list managed by the server from the vehicle, receiving a response about an inquiry into the cargo in the trailer from the RFID receiver of the cargo, detecting a cargo difference in the trailer based on the received cargo list in the trailer and forwarding an alert of the cargo difference in the trailer to the vehicle.

According to an example of the method of the present disclosure, the cargo loss event detection monitoring in the trailer comprises, according to whether at least one signal occurs among a door open/close signal of the trailer, generation of a departure signal of the vehicle, or navigation destination information, updating data of the server by comparing data of the trailer and data of the vehicle.

According to the present disclosure, a method is provided for preventing cargo loss in a trailer through service sharing between a vehicle and the trailer, which is implemented by the server. The method may comprise: receiving, from the vehicle, vehicle information and trailer information obtained from the trailer, selecting vehicle software for cargo monitoring and trailer software for cargo monitoring based on the vehicle information and the trailer information, adding trailer data to the selected vehicle software for cargo monitoring, transmitting the selected vehicle software for cargo monitoring and the selected trailer software for cargo monitoring to the vehicle and making the vehicle software for cargo monitoring and the trailer software for cargo monitoring interwork with each other to perform monitoring for a cargo in the trailer and receiving a monitoring result.

According to another example of the present disclosure, a vehicle is provided sharing a service with a trailer for preventing trailer cargo loss. The vehicle may comprise: a memory configured to store at least one piece of software and an instruction and a vehicle controller configured to perform wired and wireless communication with a server and a trailer controller and execute the at least one piece of software stored in the memory, wherein the vehicle controller is further configured to according to the instruction, connect to the trailer controller for communication, obtain trailer information from the trailer controller, transmit vehicle information and the obtained trailer information to the server, receive, as a response to the transmitted vehicle information and the transmitted trailer information, selected vehicle software for cargo monitoring and selected trailer software for cargo monitoring from the server, transmit the trailer software for cargo monitoring to the trailer and perform loss prevention monitoring for a cargo in the trailer by operating the vehicle software for cargo monitoring that interworks with the trailer software for cargo monitoring.

According to an example of the vehicle of the present disclosure, the loss prevention monitoring for the cargo in the trailer includes cargo inquiry monitoring and/or cargo loss occurrence detection monitoring in the trailer.

According to an example of the vehicle of the present disclosure, the method performed by the vehicle may further comprise: performing route optimization according to a cargo destination based on operation of the trailer software for cargo monitoring.

According to an example of the vehicle of the present disclosure, the cargo inquiry monitoring in the trailer comprises: receiving an inquiry request for a cargo in the trailer from an external device, transmitting the inquiry request for the cargo in the trailer to the trailer, receiving a response about an inquiry into the cargo in the trailer from the trailer and sending, as a response, a cargo list in the trailer to the external device.

According to an example of the vehicle of the present disclosure, the cargo loss event detection monitoring in the trailer comprises: receiving a cargo list managed by the server from the server, forwarding the cargo list managed by the server to the trailer, receiving a response about an inquiry into the cargo in the trailer from the trailer, receiving an alert of a cargo difference in the trailer from the trailer and forwarding the alert of the cargo difference in the trailer to the external device.

According to another example of the present disclosure, a trailer is provided sharing a service with a vehicle for preventing trailer cargo loss. The trailer may comprising: a memory configured to store at least one piece of software and an instruction and a trailer controller configured to perform wired and wireless communication with a server and a vehicle controller and execute the at least one piece of software stored in the memory, wherein the trailer controller is further configured to: according to the instruction, connect to the vehicle controller for communication, transmit trailer information to the vehicle controller, receive trailer software for cargo monitoring from the vehicle controller—wherein the received trailer software for cargo monitoring corresponds to trailer software selected by a server based on vehicle information and the trailer information that are transmitted by the vehicle controller to the server, and perform loss prevention monitoring for a cargo in the trailer by operating the trailer software for cargo monitoring that interworks with vehicle software for cargo monitoring.

According to another example of the present disclosure, a server is provided sharing a service between a vehicle controller and a trailer controller for preventing trailer cargo loss. The server may comprising: a memory configured to store software capable of providing at least one or more services and a processor configured to execute the at least one or more services of the memory, wherein the processor is further configured to: receive vehicle information and trailer information obtained from the trailer controller from the vehicle controller, add trailer data to selected vehicle software for cargo monitoring, transmit the selected vehicle software for cargo monitoring and selected trailer software for cargo monitoring to a vehicle and perform loss prevention monitoring for a cargo in a trailer by operating the trailer software for cargo monitoring that interworks with vehicle software for cargo monitoring and receive a monitoring result.

According to the present disclosure, it is possible to provide a method and device for preventing cargo loss of a trailer through service sharing between a vehicle and the trailer by receiving selected cargo monitoring software from a server through wired or wireless communication between an integrated controller in the vehicle and an integrated controller in the trailer.

According to the present disclosure, it is possible to provide a method and device for inquiring a cargo in a trailer and/or detecting an incident of loss through loss prevention monitoring for cargoes in the trailer.

According to the present disclosure, it is possible to provide a method and device for an integrated controller in a trailer to optimize a route to a cargo destination according to the operation of received trailer software for cargo monitoring and to transmit the route to a navigation unit in a vehicle.

While the methods of the present disclosure described above are represented as a series of operations for clarity of description, it is not intended to limit the order in which the steps are performed. The steps described above may be performed simultaneously or in different order as desired. In order to implement the method according to the present disclosure, the described steps may further include different or other steps, may include remaining steps except for some of the steps, or may include other additional steps except for some of the steps.

The various examples of the present disclosure do not disclose a list of all possible combinations and are intended to describe representative examples of the present disclosure. Examples or features described in the various examples may be applied independently or in combination of two or more.

In addition, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed:

1. A method performed by a vehicle for preventing cargo loss in a trailer of the vehicle, the method comprising:
- communicatively coupling to the trailer;
- obtaining, via the coupling, trailer information of the trailer;
- transmitting, to a server, vehicle information of the vehicle and the trailer information;
- based on the transmitting, receiving, from the server, a pair of selected software components for cargo monitoring, wherein the pair of selected software components comprise vehicle software and trailer software;
- transmitting the trailer software to the trailer; and
- performing loss prevention monitoring for a cargo in the trailer by operating the vehicle software, while the vehicle software interworks with the transmitted trailer software.

2. The method of claim 1, wherein the performing loss prevention monitoring comprises at least one of cargo inquiry monitoring in the trailer or cargo loss event detection monitoring in the trailer.

3. The method of claim 2, wherein the cargo inquiry monitoring in the trailer comprises:
- receiving, from an external device, an inquiry request for the cargo in the trailer;
- transmitting the inquiry request to the trailer;
- receiving, from the trailer, a response to the inquiry request; and
- sending, to the external device, a cargo list of the trailer, wherein the cargo list of the trailer is a response to the inquiry request from the external device.

4. The method of claim 2, wherein the cargo loss event detection monitoring in the trailer comprises:
- receiving, from the server, a cargo list managed by the server;

forwarding the cargo list to the trailer;

receiving, from the trailer, a response about an inquiry into the cargo in the trailer;

receiving, from the trailer, an alert of a cargo difference in the trailer; and forwarding the alert of the cargo difference in the trailer to an external device.

5. The method of claim 1, further comprising performing, based on operation of the transmitted trailer software, route optimization according to a cargo destination.

6. A method performed by a trailer of a vehicle for preventing cargo loss in the trailer, the method comprising:

communicatively coupling to the vehicle;

transmitting, via the coupling, trailer information of the trailer to the vehicle;

receiving, from the vehicle, trailer software for cargo monitoring, wherein the trailer software corresponds to software selected by a server based on vehicle information of the vehicle and the trailer information, and wherein the vehicle information and the trailer information are transmitted by the vehicle to the server; and performing loss prevention monitoring for a cargo in the trailer by operating the received trailer software, while the received trailer software interworks with vehicle software, installed in the vehicle, for cargo monitoring.

7. The method of claim 6, wherein the performing loss prevention monitoring comprises at least one of cargo inquiry monitoring in the trailer or cargo loss event detection monitoring in the trailer.

8. The method of claim 7, wherein the cargo inquiry monitoring in the trailer comprises:

receiving, from the vehicle, an inquiry request for the cargo in the trailer;

receiving, from a communication device associated with the cargo, a response about an inquiry into the cargo in the trailer; and sending a cargo list of the trailer to the vehicle, wherein the cargo list of the trailer is a response to the inquiry request from the vehicle.

9. The method of claim 7, wherein the cargo loss event detection monitoring in the trailer comprises:

receiving, from the vehicle, a cargo list managed by the server;

receiving, from a communication device associated with the cargo, a response about an inquiry into the cargo in the trailer, wherein the response comprises a cargo list of the trailer;

detecting, based on the cargo list of the trailer, a cargo difference in the trailer; and forwarding an alert of the cargo difference in the trailer to the vehicle.

10. The method of claim 9, wherein the cargo loss event detection monitoring further comprises, based on at least one of a door open signal of the trailer, a door close signal of the trailer, a departure signal of the vehicle, or navigation destination information, updating data of the server by comparing data of the trailer and data of the vehicle.

11. A vehicle for preventing trailer cargo loss in a trailer of the vehicle, the vehicle comprising:

a communication interface configured to communicate the trailer;

a processor; and a memory storing an instruction that, when executed by the processor, is configured to cause the vehicle to:

perform wired and wireless communication with a server and a trailer controller of the trailer;

communicatively couple to the trailer controller;

obtain, via the coupling, trailer information of the trailer from the trailer controller;

transmit, to the server, vehicle information of the vehicle and the trailer information;

receive, from the server and based on the transmitted vehicle information and the transmitted trailer information, a pair of selected software components for cargo monitoring, wherein the pair of selected software components comprise vehicle software and trailer software;

transmit the trailer software to the trailer; and perform loss prevention monitoring for a cargo in the trailer by operating the vehicle software, while the vehicle software interworks with the transmitted trailer software.

12. The vehicle of claim 11, wherein the instruction, when executed by the processor, is configured to cause the vehicle to perform the loss prevention monitoring by performing at least one of cargo inquiry monitoring in the trailer or cargo loss event detection monitoring in the trailer.

13. The vehicle of claim 12, wherein the instruction, when executed by the processor, is configured to cause the vehicle to perform the cargo inquiry monitoring in the trailer by:

receiving, from an external device, an inquiry request for the cargo in the trailer;

transmitting the inquiry request to the trailer;

receiving, from the trailer, a response to the inquiry request; and sending, to the external device, a cargo list of the trailer, wherein the cargo list of the trailer is a response to the inquiry request from the external device.

14. The vehicle of claim 12, wherein the instruction, when executed by the processor, is configured to cause the vehicle to perform the cargo loss event detection monitoring in the trailer by:

receiving, from the server, a cargo list managed by the server;

forwarding the cargo list to the trailer;

receiving, from the trailer, a response about an inquiry into the cargo in the trailer;

receiving, from the trailer, an alert of a cargo difference in the trailer; and forwarding the alert of the cargo difference in the trailer to an external device.

15. The vehicle of claim 14, wherein the instruction, when executed by the processor, is configured to adjust, based on the cargo difference in the trailer, autonomous driving control of the vehicle.

16. The vehicle of claim 15, wherein the instruction, when executed by the processor, is configured to adjust the autonomous driving control of the vehicle by switching an autonomous driving mode to a manual driving mode.

17. The vehicle of claim 11, wherein the instruction, when executed by the processor, is configured to cause the vehicle to perform, based on operation of the transmitted trailer software, route optimization according to a cargo destination.

* * * * *